US00RE40394E

(19) United States
(12) Reissued Patent
Roos et al.

(10) Patent Number: US RE40,394 E
(45) Date of Reissued Patent: Jun. 24, 2008

(54) TELEOPERATED ROBOTIC SORTING SYSTEM

(75) Inventors: Charles E. Roos, Nashville, TN (US); Edward J. Sommer, Jr., Nashville, TN (US); Robert H. Parrish, Nashville, TN (US); James R. Russell, Brentwood, TN (US)

(73) Assignee: National Recovery Technologies, Inc., Nashville, TN (US)

(21) Appl. No.: 10/252,444

(22) PCT Filed: Nov. 3, 1997

(86) PCT No.: PCT/US97/19680

§ 371 (c)(1),
(2), (4) Date: Jul. 12, 1999

(87) PCT Pub. No.: WO98/19799

PCT Pub. Date: May 14, 1998

Related U.S. Patent Documents

Reissue of:
(64) Patent No.: 6,124,560
Issued: Sep. 26, 2000
Appl. No.: 09/297,081
Filed: Nov. 3, 1997

U.S. Applications:
(60) Provisional application No. 60/030,183, filed on Nov. 4, 1996.

(51) Int. Cl.
*B07C 5/00* (2006.01)

(52) U.S. Cl. ..... 209/578; 209/587; 209/705; 209/942

(58) Field of Classification Search ..... 209/576, 209/577, 578, 579, 587, 588, 589, 639, 702, 209/705, 942; 250/336.1; 378/62
See application file for complete search history.

(56) References Cited

U.S. PATENT DOCUMENTS

| | | | | | |
|---|---|---|---|---|---|
| 4,805,778 | A | * | 2/1989 | Nambu | 209/3.3 |
| 4,942,538 | A | * | 7/1990 | Yuan et al. | 700/259 |
| 5,044,002 | A | * | 8/1991 | Stein | 378/54 |
| 5,141,110 | A | * | 8/1992 | Trischan et al. | 209/524 |
| 5,260,576 | A | * | 11/1993 | Sommer et al. | 250/359.1 |
| 5,299,693 | A | * | 4/1994 | Ubaldi et al. | 209/3.3 |
| 5,339,962 | A | * | 8/1994 | Sommer et al. | 209/576 |
| 5,411,147 | A | * | 5/1995 | Bond | 209/44.4 |
| 5,423,431 | A | * | 6/1995 | Westin | 209/539 |
| 5,520,290 | A | * | 5/1996 | Kumar et al. | 209/580 |
| 5,555,984 | A | * | 9/1996 | Sommer et al. | 209/580 |
| 5,600,700 | A | * | 2/1997 | Krug et al. | 378/57 |
| 5,699,400 | A | * | 12/1997 | Lee et al. | 378/57 |
| 5,752,607 | A | * | 5/1998 | Fink | 209/576 |
| 6,124,560 | A | * | 9/2000 | Roos et al. | 209/578 |

* cited by examiner

*Primary Examiner*—David H. Bollinger
(74) *Attorney, Agent, or Firm*—Foley & Lardner LLP

(57) ABSTRACT

A method and apparatus are disclosed for classifying materials utilizing a computerized touch sensitive screen or other computerized pointing device for operator identification and electronic marking of spatial coordinates of materials to be extracted. An operator positioned at a computerized touch sensitive screen views electronic images of the mixture of materials to be sorted as they are conveyed past a sensor array which transmits sequences of images of the mixture either directly or through a computer to the touch sensitive display screen. The operator manually "touches" objects displayed on the screen to be extracted from the mixture thereby registering the spatial coordinates of the objects within the computer. The computer then tracks the registered objects as they are conveyed and directs automated devices including mechanical means such as air jets, robotic arms, or other mechanical diverters to extract the registered objects.

59 Claims, 8 Drawing Sheets

FIG. 7A
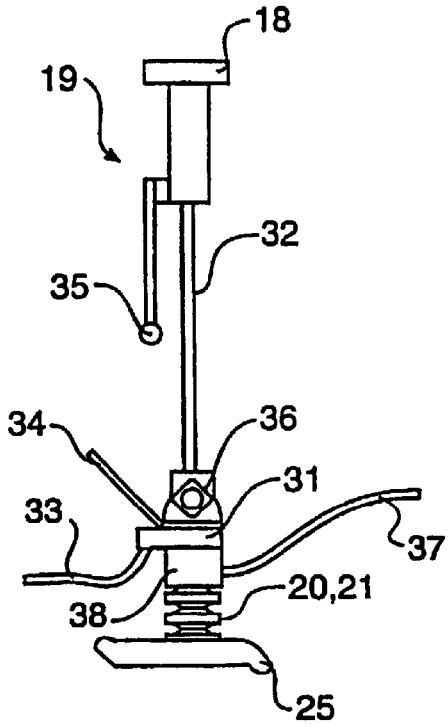
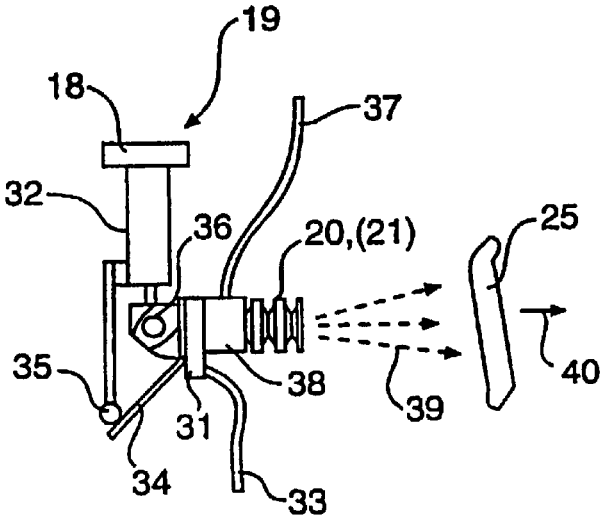
FIG. 7B

FIG. 8A
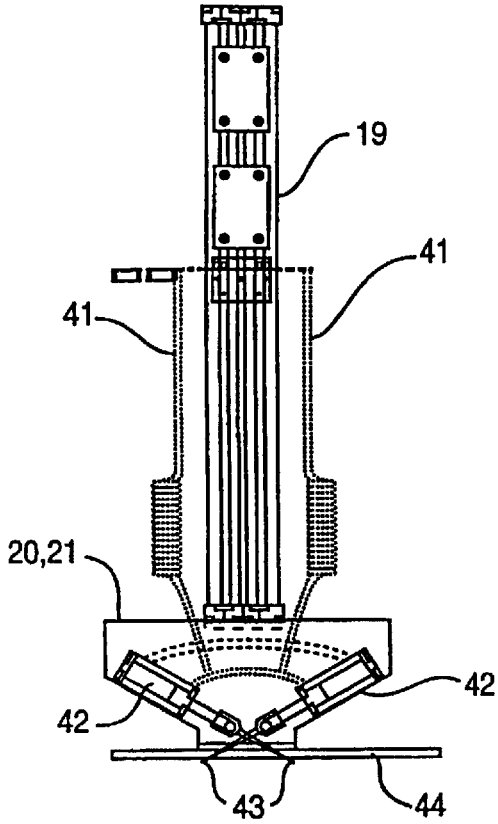
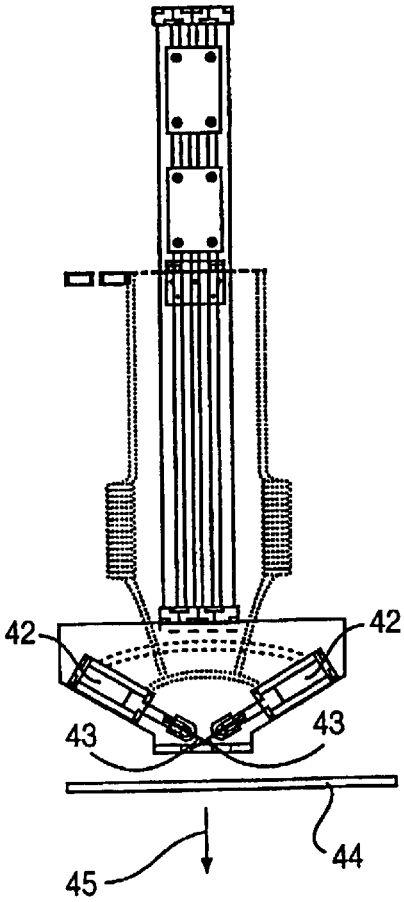
FIG. 8B

TELEOPERATED ROBOTIC SORTING SYSTEM

Matter enclosed in heavy brackets [ ] appears in the original patent but forms no part of this reissue specification; matter printed in italics indicates the additions made by reissue.

This application is a 371 a PCT/US97/19680, filed Nov. 3, 1997 which is a continuation of provisional application 60/030,183 filed Nov. 4, 1996.

The present invention relates generally to a robotic sorting system, and, more particularly to a robotic sorting system suitable for separating recyclable or waste material. This invention was made with Government support under Contract No. DE-FG02-95ER82037, having an effective date of Sep. 1, 1995, a ward ed by the United States Department Of Energy. The Government has certain rights in the invention.

BACKGROUND OF THE INVENTION

In the recycling of waste secondary materials it is very useful to be able to separate mixtures of materials into usable fractions. Such separations are sometimes performed by fully automated systems which use automated sensors for materials identification with subsequent automated extraction of selected materials from mixtures such as disclosed in U.S. Pat. Nos. 5,260,576 and 5,555,984. In many instances automated materials handling and sorting systems are combined with manual handsorting in a semi-automated process such as that disclosed in U.S. Pat. No. 5,411,147. In many other systems, particularly at smaller recycling facilities, most of the sorting is done by manual handsorting.

In a fully automated sorting system identification of materials to be extracted from a conveyed stream is performed by automated sensors which are specific to identification of certain materials. Advantages to these systems are often high speed and the lack of need for manual labor. A disadvantage to these systems is that automated sensors are generally limited in their ability to identify a wide range of materials and therefore have limited applicability to only selected sorting tasks. On the other hand, in manual handsorting the human visual sensory system is used to make identifications and advantageously is capable of efficiently identifying a wide range of various materials to be sorted. However, also in manual handsorting, human hands are used to make the sorting extractions from the waste stream with disadvantages of relatively low capacity compared to the speed of identifications that a human can perform, and secondly, handsorting requires that humans come into contact with a waste stream which in general is unsanitary and often contains hazardous objects such as broken glass and other objects which can easily puncture or cut.

Present sorting technologies for waste materials generally require the presence of an operator on the sorting floor or, in the case of manual handsorting, at the sorting line manually extracting recyclable materials from the waste stream. This generally requires that the equipment operator or manual handsorters be able-bodied. Therefore this type of work has generally not been available to the physically handicapped since the physical demands of the work would be beyond their capabilities or would place them in a dangerous environment because of their physical condition. This situation has lessened job opportunities for the physically handicapped.

Robotic systems have been applied in industry for a number of years typically to reduce human labor, reduce human presence in hazardous or potentially hazardous situations, and to replace humans in tedious repetitive tasks. In U.S. Pat. No. 5,299,693 a robotic system is described for extracting recyclable materials from a waste stream where the recyclable materials physically have a tag coupled to them which provides a non-visual identifying signal which can be received by a sensor for identification and with a robotic arm subsequently guided into the waste stream to retrieve the tagged item. However, the requirement for physical attachment of a signal generating tag to the items to be sorted limits the usefulness of the process and would require a massive change in practices by the packaging industry to provide such signal markers on packaging materials typically found in the waste stream. U.S. Pat. No. 5,411,147 discloses using robotic arms to extract materials from a waste stream although details of the robotic systems and interactive functions with humans are not provided. U.S. Pat. No. 4,942,538 discloses a teleoperated robotic tracker which is guided by a human operator using a joystick type hand controller with video feedback of robotic arm motion to the operator from a camera mounted on the robotic arm. The use of such a system for recyclables sorting would be awkward and slow since the human operator would need to provide continual guidance to the robotic arm throughout the whole sorting process. There are numerous other robotic systems with interactive human operation disclosed in the prior art. However, nowhere in the prior art have the inventors found descriptions of robotic systems for sorting materials where the identification of selected materials to be extracted from a waste stream or other conveyed stream of materials is provided by a human operator utilizing a computerized pointing device such as a touch screen for electronically registering the spatial coordinates of the selected materials with subsequent fully computerized control of a mechanical or other robotic system to acquire and extract the selected materials from the conveyed stream.

SUMMARY OF THE INVENTION

One of the objectives of the present invention is to alleviate one or more of the problems identified above. Another objective of the present invention is to provide a sorting technology which incorporates the sensing flexibility and sensing speed of a human being combined with high speed high capacity mechanical material extraction systems to provide a highly flexible capacity sorting system. A second objective is to provide a sorting technology which incorporates the sensing flexibility and sensing speed of a human being while insulating the human being from contact with the material stream. A third objective is to provide a sorting technology which can be operated by the physically handicapped. A fourth objective is to provide an automated sorting technology capable of being trained by a human operator in order to become fully automated.

These and other objectives are achieved by providing a method for identifying and sorting material objects from a mixture of material objects in which the mixture of material objects is conveyed through an inspection zone. The mixture of material objects is irradiated with incident electromagnetic radiation in the inspection zone. The electromagnetic radiation emanating from the irradiated material objects is measured and processed to produce electronic images suitable for visual display. Interactive selection of material objects is performed and the selected material objects are then separated from the mixture of material objects by an automated device.

Therefore, the herein disclosed invention overcomes the limitations discussed above in automated sorting systems, manual handsorting, and in robotic sorting systems by providing for rapid human identification and selection of objects to be sorted with subsequent rapid extraction of selected objects by fully computerized mechanical means. The invention further provides for use of the human capability for rapid and efficient identification and selection of materials to be sorted without subjecting the human operator to direct contact with the material stream and without requiring that the operator be present on the sorting floor. The invention further provides for human training of the sorting system so that the sorting system retains the flexibility of the human for identifying selected materials for sorting while being fully automated.

The disclosed invention classifies materials by utilizing a computerized touch screen or other computerized pointing device for operator identification and electronic marking of spatial coordinates of materials to be extracted from a mixture of materials with subsequent computerized position tracking and extraction of the marked materials by computer controlled mechanical means. More specifically, an operator positioned at a computerized touch screen views electronic images of the mixture of materials to be sorted as they are conveyed past a sensor array which transmits a sequence of images of the mixture to a touch screen either directly or through a computer. The operator views the touch screen images and manually "touches" objects displayed on the screen to be extracted from the mixture thereby registering the spatial coordinates of the objects within the computer. The computer then tracks the registered objects as they are further conveyed and directs mechanical means such as air jets, robotic arms, or other mechanical diverters to extract the registered objects from the mixture at an appropriate position downstream from the camera position. High speed communications between the touch screen, computer, and mechanical sorting equipment allows that the touch screen monitor can be located remote from the sorting environment such as in an air conditioned office or even at a remote location such as across town or in another locally altogether. Therefore there is no requirement that the operator be in contact with or even near the material stream.

The computer is also capable of "learning" the properties of those objects being selected for extraction by the operator and capable of taking over the selecting process after a sufficient learning process. At that time the system becomes a fully automated sorting system for extraction of those types of selected objects. At any time the computer can be retrained to select different or additional objects by the operator selecting the different or additional objects through the touch screen or other computerized pointing device.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

FIGS. 7a and 7b are diagrams showing the operation of the robotic arm.

FIGS. 8a and 8b are diagrams showing the operation of another embodiment of the robotic arm.

DESCRIPTION OF THE PREFERRED EMBODIMENTS

Figure 1:
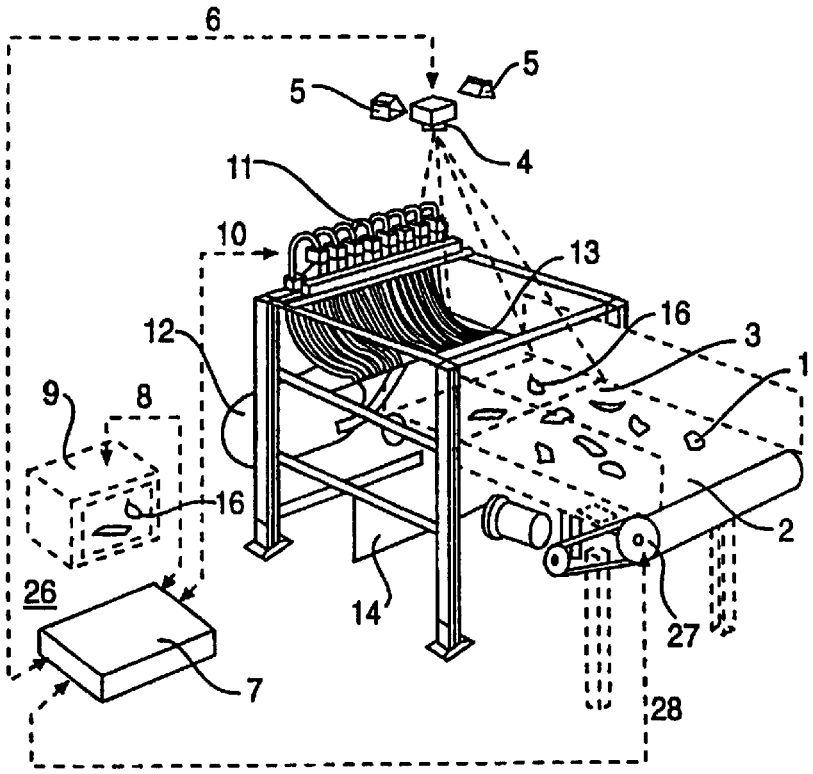
FIG. 1 is a perspective view of the apparatus according to a first preferred embodiment of the invention.

A first preferred embodiment of the invention is shown in FIG. 1. A mixture of materials 1 to be sorted are conveyed on conveying surface 2 through an inspection zone 3 which is irradiated with electromagnetic radiation from radiation sources 5, for instance halogen lamps when sensing is performed in the visible light range. Other suitable radiation sources 5 can include, for example, Klystron tube (microwave radiation), UV lamp (ultraviolet radiation), IR lamp (infrared radiation), X-Ray tube (X-Ray radiation) and a Radio-Nuclide source (gamma rays). Conveying surface 2 may be a belt conveyor, a slide, a vibrating pan conveyor, a free fall trajectory, or any other means for conveying materials. The material objects comprising the mixture of materials 1 may be conveyed singly or in plurality.

A sensor array 4 (for example, Sony Series 9000 CCD video camera when radiation from sources 5 is in the visible light range) is positioned to view the inspection zone so to provide data arrays corresponding to measurements of electromagnetic radiation emanating from inspection zone 3 and from any materials 1 being conveyed through the inspection zone. The electromagnetic radiation emanating from materials 1 may be reflected radiation, radiation transmitted through materials 1, radiation emitted from materials 1 through fluorescence, or any other forms of radiation resulting from interaction of materials 1 with the incident radiation from sources 5. Sensor array 4 is shown positioned above conveying surface 2 although in practice it may be located at any position required to give the desired view. Sensor array 4 is selected to be sensitive in the wavelength range of electromagnetic radiation emanating from material objects within the inspection zone 3 when irradiated by sources 5 which may be a single source or multiple sources. The geometry of sensor array 4 is determined by the application. For instance the sensor array 4 may be a linear array of sensors or an area array of sensors. It may physically span the full width and/or length of the inspection zone 3 or it may be more compact and use optics to scan the width and/or length of the inspection zone such as with a CCD camera. Sensor array 4 may be positioned on the same side of the inspection zone 3 as is irradiation sources 5 or it may be positioned on the opposite side of inspection zone 3 from sources 5 or positioned at any other location with respect to irradiation sources 5 and inspection zone 3. The effective wavelength ranges of sensor array 4 and sources 5 may each be in any one of the microwave wavelength range, the ultraviolet wavelength range, the visible light wavelength range, the infrared wavelength range, the x-ray wavelength range, or the gamma ray wavelength range or any combination thereof. Sensor array 4 may be fitted with special filters which allow only certain wavelengths of electromagnetic radiation to reach sensor array 4 for measurement.

Sensor array 4 data corresponding to electromagnetic radiation measurements emanating from the inspection zone 3 and from material objects 1 within the inspection zone are transmitted from sensor array 4 to computer 7 and/or touch sensitive screen 9 over transmitting cables 6 or by wireless means. Control of sensor array 4 operation may also be provided by computer 7 over transmitting cables 6 or by wireless transmission. Sensor array 4 data received by computer 7 are processed for analog to digital conversion if not already digital by nature of sensor array 4 and microcomputer processed into digitized electronic images which are transmitted over cables 8 to touch sensitive screen 9 which is capable of electronically registering the coordinates on the screen of a manual touch by a human operator 26. Touch screen 9 displays the digitized images corresponding to the sensor data from sensor array 4 of the inspection zone 3 and the materials to be sorted within the inspection zone 3. Alternatively, the sensor array 4 can transmit the images directly to the touch sensitive screen 9.

Figure 2:
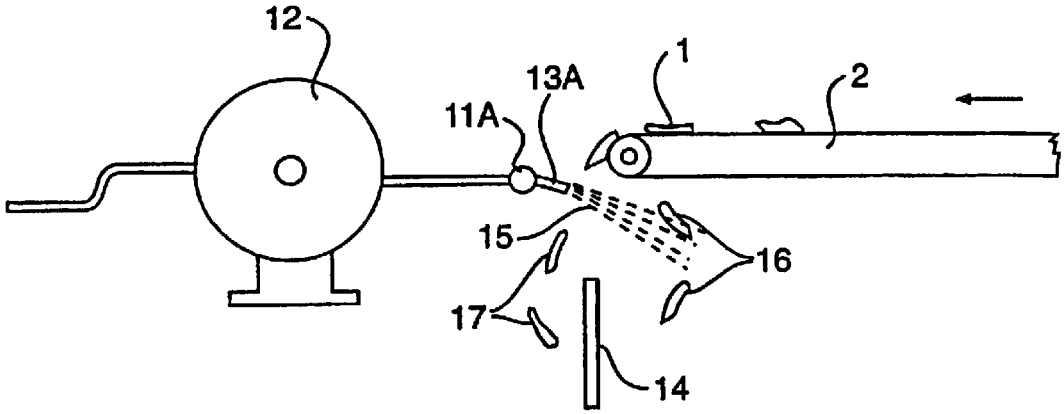
FIG. 2 is a schematic diagram showing material objects diverted by an air blast.

Human operator 26 views the electronic images on touch screen 9 and manually touches the image of any material object, in this case object 16, which the operator wishes to be removed from the stream of materials 1. Spatial coordinates describing the location on the touch sensitive screen 9 of the touch by operator 26 are registered by touch sensitive screen 9 and transmitted over cables 8 to computer 7. Computer 7 associates the touch screen coordinates of the registered touch with corresponding spatial location coordinates on conveying surface 2 within inspection zone 3 and further associates any object on conveying surface 2 at that location (in this case object 16) with the touch. Computer 7 then electronically tracks the motion of selected object 16 as it is further conveyed along conveying surface 2 utilizing signals transmitted over cables 28 indicating conveyor speed generated by conveyor speed encoder 27. Similarly, the motion could be tracked by programming into computer 7 a predetermined speed for conveying surface 2 in which case conveyor speed encoder 27 would not be needed. As object 16 leaves the inspection zone 3 and drops off the discharge end of conveying surface 2 it is diverted from its falling trajectory by air blast 15 as shown in FIG. 2. Air blast 15 is generated by computer 7 by sending at the right time control signals over cables 10 (FIG. 1) to the appropriate air solenoid valve 11a within air solenoid array 11 to open air solenoid valve 11a for an appropriate length of time to eject object 16. At such time compressed air from air reservoir 12 flows through air solenoid 11a and is emitted as an air blast from air nozzle 13a within air nozzle array 13, and ejects selected object 16 so that it falls over splitter plate 14 and is segregated from non-ejected material objects 17. In this way selected objects may be sorted away from a mixture of objects.

Further details of the present invention are described in the applicants' report to the U.S. Department of Energy, Phase II application under Grant application number 35853-95-I, titled "Use of Computer Robotics to Reduce Human Contact with the Waste Stream and Lower the Costs for Recyclable Materials," (hereafter "DOE Report") and in provisional application 60/030,183 filed Nov. 4, 1996, the disclosures of which are incorporated herein, in their entireties.

Computer 7 may contain a pre-compiled pattern database or identification and pattern recognition algorithms which can perform learning of selections by operator 26 as the operator makes the selections. Such identification and pattern recognition algorithms may be accomplished by computerized neural networks or other such pattern recognition computer code. Identification by pattern recognition of the objects can be performed by using, for example, the edge enhancement and image contour extraction techniques disclosed in the DOE Report at pages 22–29. Further details of pattern recognition and its interaction with robotic systems is described in the published text titled "Robot Vision," Berthold Klaus Paul Horn, MIT Press, Cambridge, Mass. (1991), the disclosure of which is incorporated herein, in its entirety.

Learning the recognized object patterns can be performed using known neural network or other pattern recognition and learning systems. Neural network techniques for identifying and learning patterns are described in, for example, the published text "Neural Networks for Pattern Recognition," Christopher M. Bishop, Oxford University Press, New York (1995), (hereafter "Bishop"), the disclosure of which is incorporated herein, in its entirety. Bishop chapters 3–6 describe neural network techniques including single and multiple layer perception as well as different error functions that can be used for training neural networks. Bishop, chapters 9 and 10 describe techniques for learning and generalization in a neural network.

In this case operator 26 will initially make selections of items to be extracted from the mixture of materials such as object 16. As operator 26 makes selections the associated electronic images will be processed through the computer algorithms with the imaging patterns distinctive to the selected items noted by the algorithms. As similar items are repetitively selected by operator 26 the computer algorithms associate the distinctive properties of the imaging patterns with objects to be selected for extraction and begin to electronically select similar patterns for extraction without input from the human operator 26. In this way the computerized system learns those objects to be extracted and after sufficient learning experience can begin sorting without input from operator 26.

Figure 3:
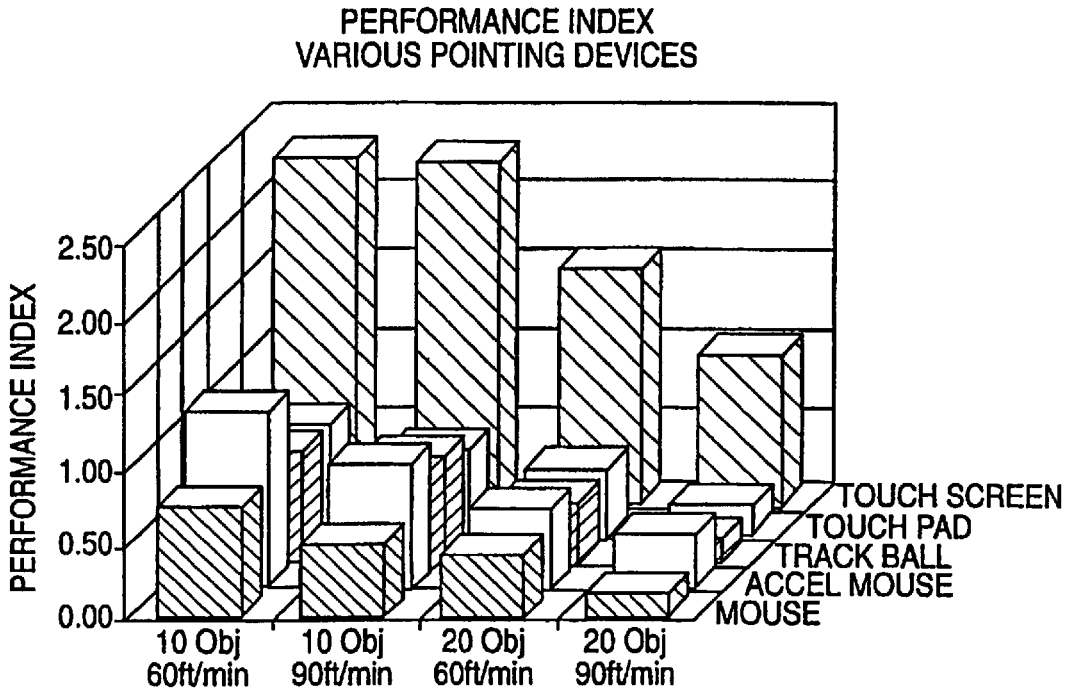
FIG. 3 is a bar graph showing the performance of various pointing devices.

The choice of using a touch screen 9 for making the selection of objects to be extracted from the mixture is a matter of preference. Similar pointing devices interfaced to a display screen could be used as a computer mouse, a track ball, a joystick, a touch pad, a light pen, or other such device. The inventors have chosen the touch screen as the preferred pointing device based upon their intensive studies of some of these various types of devices for sorting applications. FIG. 3 shows a bar graph of the results of some of these studies. The Performance Index assesses the overall performance of a human operator using such devices for "pointing and clicking" on certain objects dynamically displayed on a computer monitor in order to select these certain objects for sorting a simulation. The Performance Index considers selection accuracy, selection speed, and ease of use. Four different cases are presented for each pointing device representing various numbers of objects displayed on the monitor screen at a time conveyed at different speeds. From the data it is seen that the touch screen outperformed all other pointing devices by a wide margin.

Figure 4:
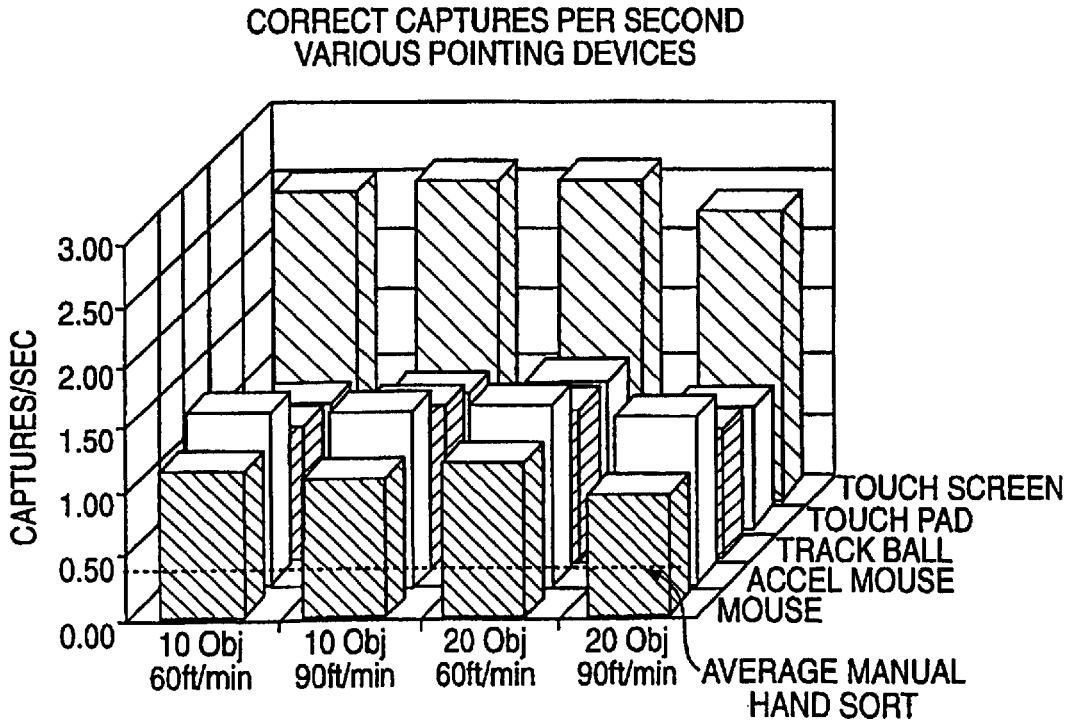
FIG. 4 is a bar graph showing the number of correct captures per second using different pointing devices.

The inventors have found that a human operator can comfortably view computerized images of a mixture of materials conveyed past a camera and identify and select items to be sorted out of the mixture at a rates up to 2.5 selections per second using a computerized touch screen to make the identifications and selections (see FIG. 4). This is two to five times as fast as industry established typical manual hand-sorting rates of one item every one to two seconds.

Figure 9:
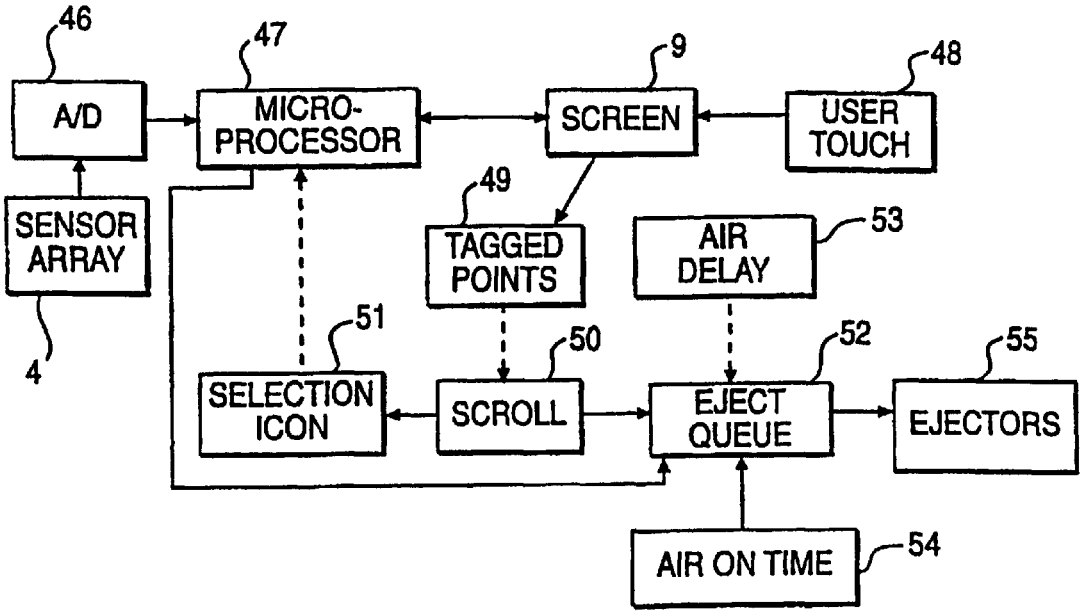
FIG. 9 is a block diagram showing the software interfaces for the first embodiment of the apparatus of the invention.

FIG. 9 shows a block diagram of software interfaces for implementing the preferred embodiment of the invention depicted in FIGS. 1 and 2. In FIG. 9 the sensor array 4 sends data through AID converter 46 to microprocessor 47. Human operator 26 (FIG. 1) touches 48 the touch sensitive screen 9 on the displayed image to select object 16 (FIG. 1). This input to touch sensitive screen 9 is tagged 49 by microprocessor 47 as a selection icon 51 which is scrolled 50 in microprocessor 47 host memory and on touch screen 9 as corresponding selected object 16 moves through inspection zone 3 (FIG. 1). Microprocessor 47 also enters a representation of selection icon 51 into the eject queue 52, assigns to the representation of selection icon 51 an appropriate value of air delay 53 to establish proper timing for ejection of selected object 16 (FIG. 1) and an appropriate value of air on time 54 to effect ejection of selected object 16 as it passes in front of ejectors 55 (shown as 11a and 13a in FIG. 2).

Figure 10:
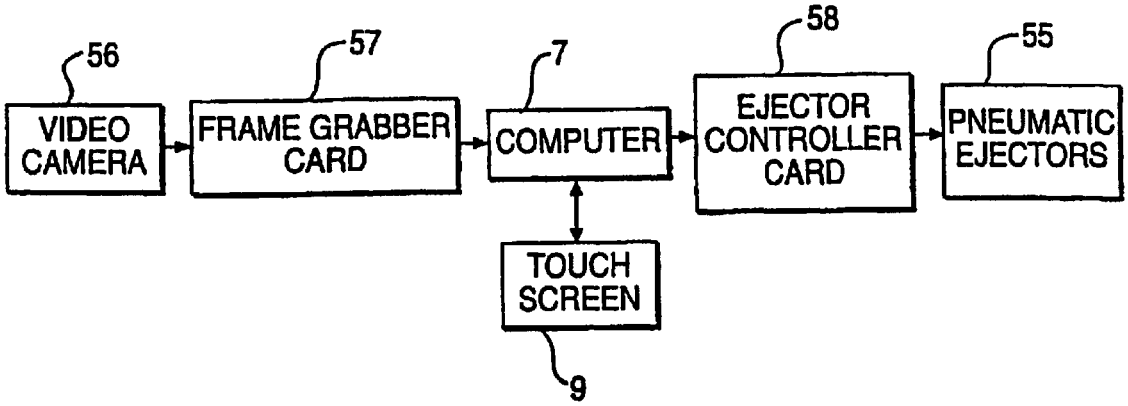
FIG. 10 is a block diagram showing the hardware components for the first embodiment.

FIG. 10 shows a block diagram of a hardware implementation for the preferred embodiment of FIGS. 1, 2, and 9. In this case video camera 56 is used as sensor array 4 (FIGS. 1 and 9) and interfaces to computer 7 (which incorporates microprocessor 47) through a frame grabber card 57. Images from video camera 56 are displayed as digitized or analog electronic images on the touch screen 9. User touch input 48 (FIG. 9) is sent back to computer 7 and processed in conjunction with the electronic images to eject selected object 16 from a mixture of materials 1 (FIG. 1) by activating pneumatic ejectors 55 (shown as 11a and 13a in FIG. 2) through ejector controller card 58 at the appropriate time. An appropriate CCD video camera for this use is a Sony Model DCX-9000 3CCD color progressive scan camera. A representative video card for interfacing with the Sony camera is Coreco Model Ultra II with RGB Digitization Module. A representative computer is Carlo Gavazzi Model 690 Industrial Computer. An appropriate touch screen is PCS Computers Inc. Series G Flat Panel Monitor. An appropriate ejector controller card is National Instruments Model PCI-DIO-96. Appropriate pneumatic ejectors are comprised of MAC Valves Inc. 6200 air solenoid valves coupled to Industrial Spray Products VeeJet Standard nozzles.

Figure 5:
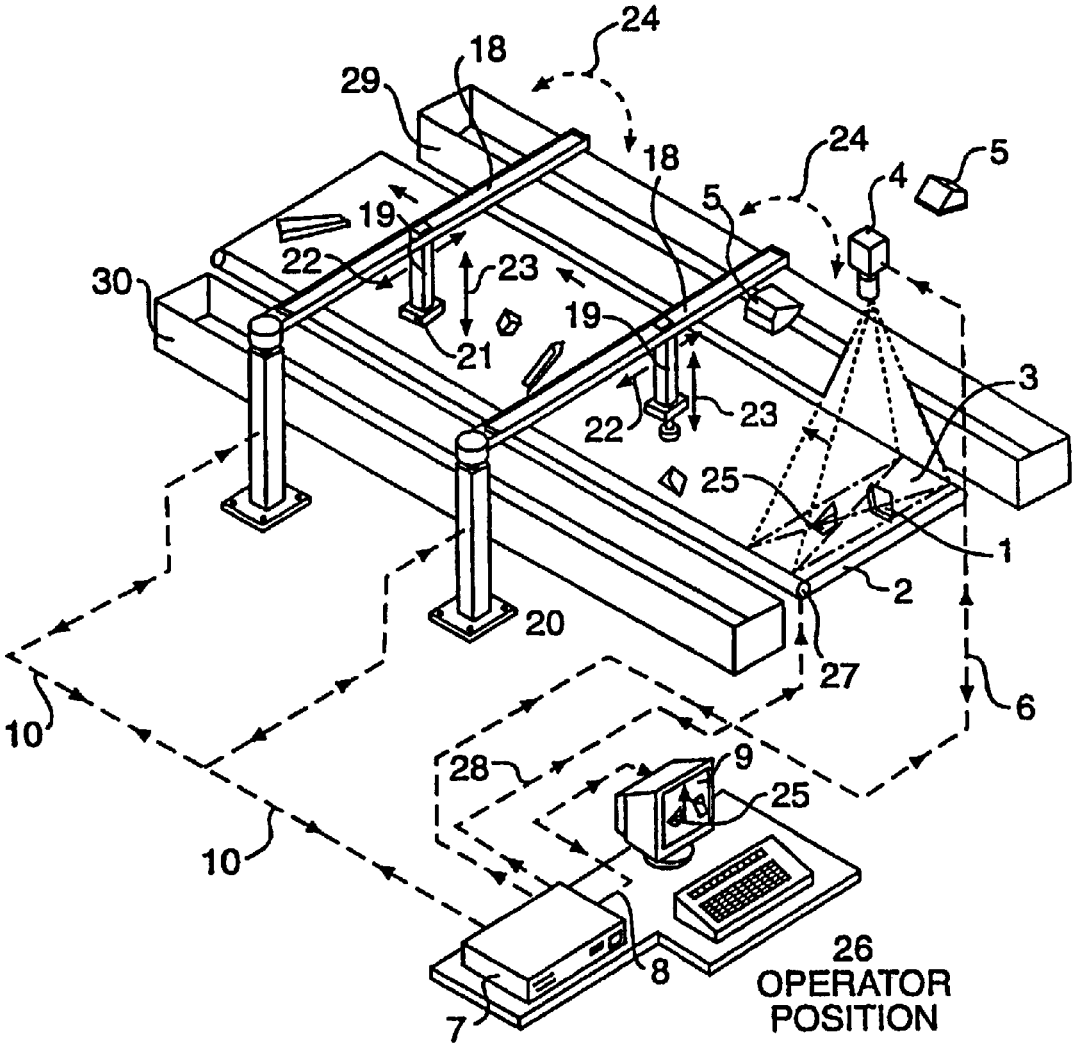
FIG. 5 is a perspective view showing a second embodiment of the apparatus according to the invention.

FIG. 5 shows a second preferred embodiment of the apparatus according to the invention. A mixture of materials 1 to be sorted are conveyed on conveyor 2 through an inspection zone 3 which is irradiated with electromagnetic radiation from radiation sources 5 (for instance halogen lamps when sensing is performed in the visible light range). Conveyor 2 may be a belt conveyor, a slide, a vibrating pan conveyor, a free fall trajectory, or any other means for conveying materials. The material objects comprising the mixture of materials 1 may be conveyed singly or in plurality.

A sensor array 4 (for example, a Sony Series 9000 CCD video camera when radiation from sources 5 is in the visible light range) is positioned to view the inspection zone 3 so to provide data arrays corresponding to measurements of electromagnetic radiation emanating from inspection zone 3 and from any materials 1 being conveyed through the inspection zone. The electromagnetic radiation emanating from materials 1 may be reflected radiation, radiation transmitted through materials 1, radiation emitted from materials 1 through fluorescence, or any other forms of radiation resulting from interaction of materials 1 with the incident radiation from sources 5. Sensor array 4 is shown positioned above conveyor 2 although in practice it may be located at any position required to give the desired view. Sensor array 4 is selected to be sensitive in the wavelength range of electromagnetic radiation emanating from material objects within the inspection zone 3 when irradiated by sources 5 which may be a single source or multiple sources. The geometry of sensor array 4 is determined by the application. For instance the sensor array 4 may be a linear array of sensors or an area array of sensors. It may physically span the full width and/or length of the inspection zone 3 or it may be more compact and use optics to scan the width and/or length of the inspection zone such as with a CCD camera. Sensor array 4 may be positioned on the same side of the inspection zone 3 as is irradiation sources 5 or it may be positioned on the opposite side of inspection zone 3 from sources 5 or positioned at any other location with respect to irradiation sources 5 and inspection zone 3. The effective wavelength ranges of sensor array 4 and sources 5 may each be in any one of the microwave wavelength range, the ultraviolet wavelength range, visible light wavelength range, the infrared wavelength range, the x-ray wavelength range, or the gamma ray wavelength range or any combination thereof. Sensor array 4 may be fitted with special filters which allow only certain wavelengths of electromagnetic radiation to reach sensor array 4 for measurement.

Sensor array 4 data corresponding to electromagnetic radiation measurements emanating from the inspection zone 3 and from material objects 1 within the inspection zone are transmitted from sensor array 4 to computer 7 over transmitting cables 6 or by wireless transmission. Control of sensor array 4 operation may also be provided by computer 7 over transmitting cables 6. Sensor array 4 data received by computer 7 are processed for analog to digital conversion if not already digital by nature of sensor array 4 and microcomputer processed into electronic images which are transmitted over cables 8 to touch sensitive screen 9 which is capable of electronically registering the coordinates on the screen of a manual touch by a human operator 26. Touch screen 9 displays the images corresponding to the sensor data from sensor array 4 of the inspection zone 3 and the materials to be sorted within the inspection zone 3.

Human operator 26 views the images on touch screen 9 and manually touches the images of any material object, in this case object 25, which the operator wishes to be removed from the stream of materials 1. Spatial coordinates describing the location on the touch screen 9 of the touch by operator 26 are registered by touch screen 9 and transmitted over cables 8 to computer 7. Computer 7 associates the touch screen coordinates of the registered touch with corresponding spatial location coordinates on the surface of conveyor 2 within inspection zone 3 and further associates any object on conveyor 2 at that location (in this case object 25) with the touch. Computer 7 then electronically tracks the motion of selected object 25 as it is further conveyed along conveyor 2 utilizing signals transmitted over cables 28 indicating conveyor speed generated by conveyor speed encoder 27. Similarly, the motion could be tracked by programming into computer 7 a predetermined speed for conveyor 2 in which case conveyor speed encoder 27 would not be needed.

As the selected object 25 is conveyed into the vicinity of robotic arms 18 the computer 7 performs scheduling algorithms to determine which of the robotic arms 18 will be used to most efficiently extract the object 25 from the waste stream. Such scheduling algorithms are specific to the equipment used and materials to be sorted and can be suitably devised by one skilled in the art using, for example, the techniques discussed in "Schedule Efficiency in a Robotic Cell" by Irina Ioachim and Francois Soumis, International Journal of Flexible Manufacturing Systems, Vol. 7, No. 1 (March 1995). The entire contents of this publication is incorporated herein by reference. There may be only one robotic arm 18 or as many robotic arms 18 as required to efficiently sort materials as selected by operator 26 on touch screen 9. For instance if the average acquisition and retrieval time of a robotic arm 18 for the materials to be sorted 1 is two seconds and the operator 26 can make an average of 2.5 selections per second then a minimum of five robotic arms 18 would be required to keep up with operator 26 selections.

As the selected object 25 approaches, the robotic arm 18 chosen by the computer to make the extraction is commanded by computer 7 over cables 10 to rotate (shown as motion 24) into proper position for most efficient timing to make an interception of object 25. Vertical actuator 19 is positioned by computer 7 through control signals over cables 10 to intercept object 25 as it passes under robotic arm 18. Vertical actuator 19 is placed by computer 7 in retracted (lifted) position so the object 25 can pass under it. As object 25 passes under actuator 19 computer 7 signals the actuator via cables 10 to extend downward until end effector 20 (or 21) contacts object 25. Upon contact with object 25 end effector 20 (or 21) acquires object 25 at which time actuator 19 retracts (lifts) and extracts object 25 from the mixture of objects 1. When object 25 is sufficiently lifted so that its lower extent is higher than the top of the other objects 1 the computer 7 signals actuator 19 to translate along robotic arm 18 in one of the directions toward the edge of the conveyor belt 2 as indicted by directional arrows 22. Positioned along each side of conveyor 2 are receiver chutes 29 and 30. Actuator 19 holding object 25 via its end effector 20 (or 21) continues moving until it is above either chute 29 or chute 30 at which time end effector 20 (or 21) releases object 25 into chute 20 or chute 30 which segregates object 25 from the other objects 1 on the conveyor 2 therefore having sorted object 25 from the other objects 1. Actuator 19 then translates back to a position over the conveyor 2 and awaits commands from computer 7 to make another object acquisition and retrieval in response to touches by operator 26 on the touch screen 9.

Computer 7 may contain identification and pattern recognition algorithms which can perform learning of selections by operator 26 as the operator makes the selections. Such identification and pattern recognition algorithms may be accomplished by computerized neural networks or other such pattern recognition computer code, as discussed earlier herein. In this case operator 26 will initially make selections of items to be extracted from the mixture of materials such as object 25. As operator 26 makes selections the associated electronic images will be processed through the computer algorithms with the imaging patterns distinctive to the selected items noted by the algorithms. As similar items are repetitively selected by operator 26 the computer algorithms associate the distinctive properties of the imaging patterns with objects to be selected for extraction and begin to electronically select similar patterns for extraction without input from the human operator 26. In this way the computerized system learns those objects to be extracted and after sufficient learning experience can begin sorting without input from operator 26.

Figure 6:
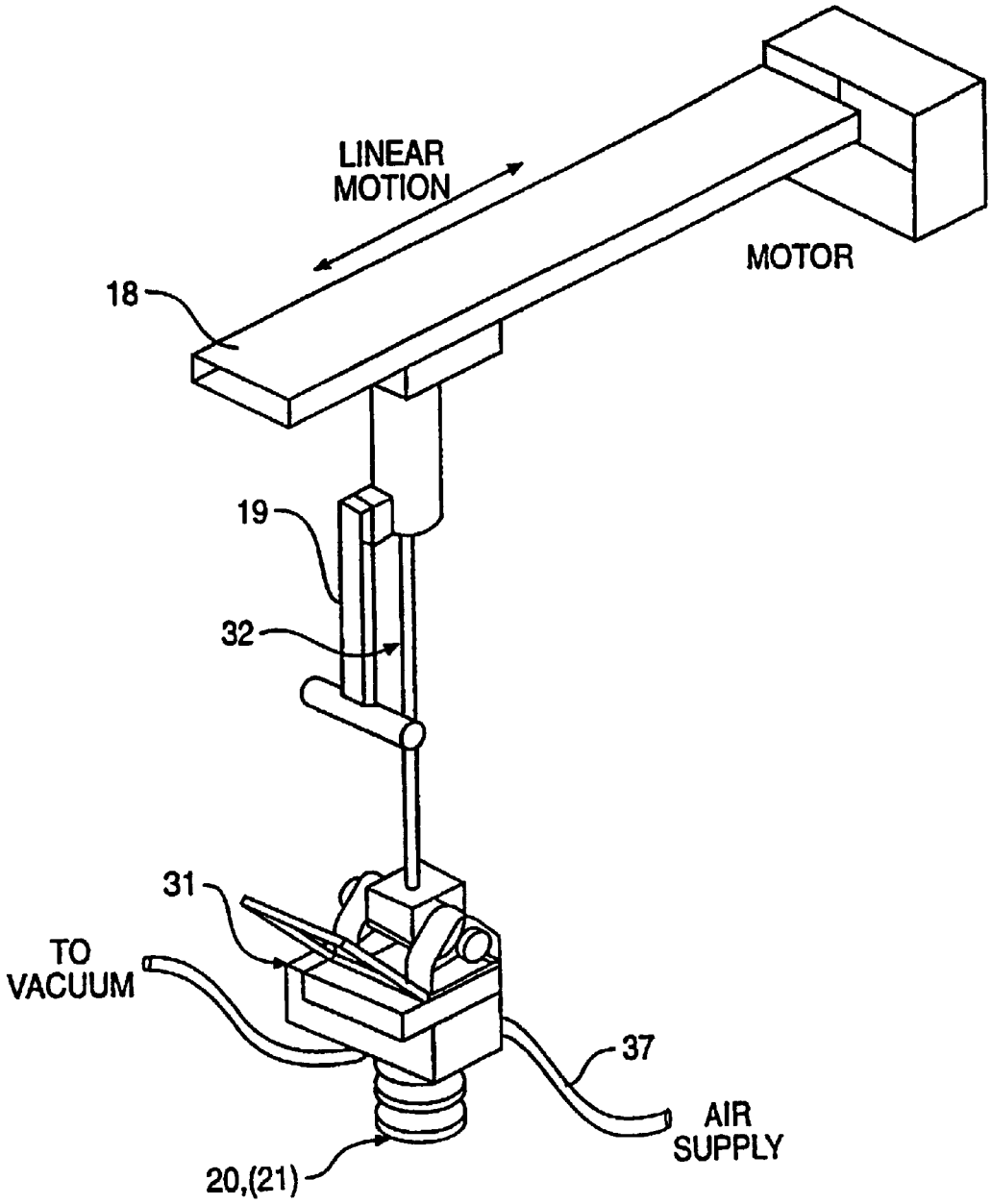
FIG. 6 is a perspective view showing an embodiment of a robotic arm according to the invention.

FIGS. 6, 7a, and 7b show views of a robotic arm 18, a vertical actuator 19, and an end effector 20 (or 21) which is a part of the preferred embodiment designed to pick up an object such as object 25 using a suction cup embodiment of the end effector 20. The vertical actuator 19 and end effector 20 (or 21) is also designed to eliminate the need for vertical actuator 19 to translate along robotic arm 18 after acquisition of object 25 in order to discharge object 25 into receiving chute 29 or receiving chute 30 (FIG. 5). The workings of this system is shown in FIGS. 7a and 7b. When robotic arm 18 and vertical actuator 19 are positioned over the object 25 to be picked up, an air cylinder 32 is extended until the suction cup end effector 20 (or 21) contacts object 25. Vacuum is applied to the suction cup by vacuum hose 33 through vacuum pump 31 and through 3-way air valve 38. Air valve 38 at this position is set to allow the vacuum from vacuum pump 31 to pass through it to suction cup end effector 20 (or 21) and to not allow any compressed air from hose 37 to pass. Air cylinder 32 is then retracted so to lift object 25. As air cylinder 32 continues to retract a fixed lever 34 strikes a fixed extension rod 35 which causes the lower portion of the actuator 19 to rotate approximately 90 degrees as shown around a pivot joint 36 so that the suction cup end effector 20 (or 21) points outward toward the receiving chute 29 or the receiving chute 30 (FIG. 5). At this time the air valve 38 is actuated to close off vacuum to the suction cup end effector 20 (or 21) and at the same time apply compressed air from the hose 37 to the suction cup. The compressed air blast 39 forcefully ejects object 25 from the suction cup end effector 20 (or 21) in a direction 40 and into the receiving chute 29 or the receiving chute 30. Computer 7 then positions vertical actuator 19 for retrieval of the next object. This sequence of actions allows the system to pick up object 25 and eject it into receiving chutes 29 or 30 without requiring any translation along robotic arm 18 to the receiving chutes. This allows a significant savings in cycle time and can reduce the number of robotic arms and vertical actuators needed for the system and thereby reducing cost. An appropriate robotic arm is comprised of Hauser HLE 100A Belt Driven Positioner coupled to Origa Rodless Cylinder Model 40-J2220/20x32.75-B-M fitted with suction cup end effector PIAB L5 Vacuum Pump with B20 Suction Cups.

FIGS. 8a and 8b show another embodiment of a vertical actuator 19 and an end effector 20 (or 21) which is designed to retrieve paper sheets or cardboard sheets 44. In this embodiment end effector 20 (or 21) is comprised of heavy duty spikes 43 which can be driven or extracted by air cylinders 42. Air for control of air cylinders 42 is supplied through air hoses 41. In operation the vertical actuator 19 is extended downward until the end effector 20 (or 21) contacts the paper sheet or cardboard 44 at which time the air cylinders 42 are actuated to rapidly and forcefully extend spikes 43 so that they penetrate through sheet 44 as shown. Vertical actuator 19 is then retracted (lifted) to lift sheet 44. Sheet 44 cannot slide off spikes 43 by virtue of their angled geometry. Actuator 19 is then translated to receiving chute 29 or 30 as previously described. When actuator 19 with sheet 44 are positioned over the receiving chute the spikes 43 are retracted by action of the air cylinders 42 and thereby withdrawing from sheet 44. This frees sheet 44 so that it can fall into the receiving chute. Vertical actuator 19 is then repositioned by computer 7 over conveyor 2 to await the next paper sheet or cardboard sheet to be retrieved. End effectors similar in design but much lighter in construction and which are designed for textile handling can be acquired from Techno Sommer, which has an Automatic SCH20 Needle Gripper product.

Figure 11:
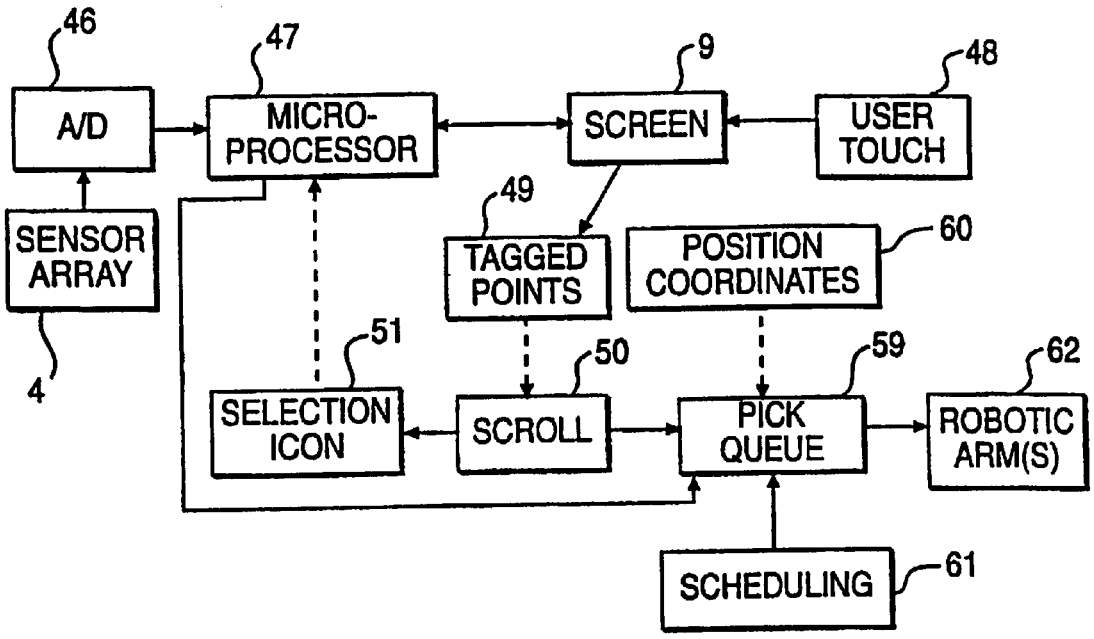
FIG. 11 is a block diagram showing the software interfaces for the second embodiment of the apparatus of the invention.

FIG. 11 shows a block diagram of software interfaces for implementing the preferred embodiment of the invention depicted in FIG. 5. In FIG. 11 the sensor array 4 sends data through A/D converter 46 to microprocessor 47. Human operator 26 (FIG. 5) touches 48 the touch screen 9 on the displayed image to select object 25 (FIG. 5). This input to touch screen 9 is tagged 49 by microprocessor 47 as a selection icon 51 which is scrolled 50 in microprocessor 47 host memory and on touch screen 9 as corresponding selected object 25 moves through inspection zone 3 (FIG. 5). Microprocessor 47 also enters a representation of selection icon 51 into the pick queue 59, assigns to the representation of selection icon 51 appropriate values of position coordinates 60 to establish proper timing for robotic acquisition (picking) of selected object 25 (FIG. 5) and a scheduling assignment 61 to an appropriate robotic arm 18 (FIG. 5) to effect acquisition of selected object 25 as it passes under the appropriate robotic arm 18 and deliver selected object 25 to an appropriate receiving chute 29 or 30 (FIG. 5). Appendix F of the DOE Report discloses sample prototype code for implementing an embodiment of the tagging 49 of a material object by the microprocessor 47 as a selection icon 51 and the subsequent tracking and generation of an ejection signal for the tagged item.

Figure 12:
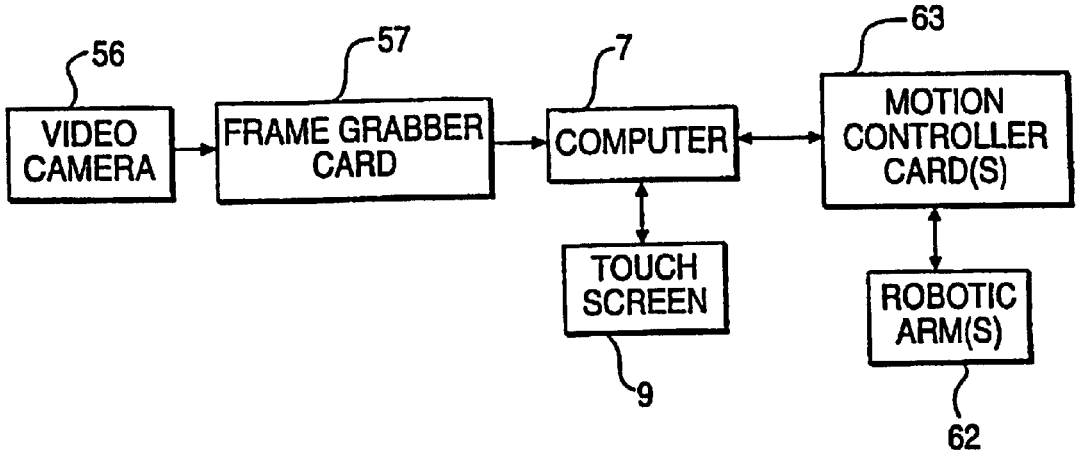
FIG. 12 is a block diagram showing the hardware components for the second embodiment.

FIG. 12 shows a block diagram of hardware implementation for the preferred embodiment of FIGS. 5 and 11. In this case video camera 56 is used as sensor array 4 (FIGS. 5 and 11) and interfaces to computer 7 (which incorporates microprocessor 47) through a frame grabber card 57. Images from video camera 56 are displayed as digitized or analog electronic images on touch screen 9 (FIG. 11). User touch input 48 (FIG. 11) is sent back to computer 7 and processed in conjunction with the electronic images to extract selected object 25 from a mixture of materials 1 (FIG. 5) by activating robotic arms 62 at the appropriate time through motion controller card(s) 63. An appropriate CCD video camera for this use is a Sony Model DCX-9000 3CCD color progressive scan camera. A representative video card for interfacing with the Sony camera is Coreco Model Ultra II with RGB Digitization Module. A representative computer is Carlo Gavazzi Model 690 Industrial Computer. An appropriate touch screen is PCS Computers Inc. Series G Flat Panel Monitor. An appropriate motion controller card is Parker Compumotor Motion Controller 806450. An appropriate robotic arm is comprised of Hauser HLE 100A Belt Driven Positioner coupled to Origa Rodless Cylinder Model 40-J2220/20x32.75-B-M fitted with suction cup end effector PIAB L5 Vacuum Pump with B20 Suction Cups.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A method for identifying and sorting selected material objects from a mixture of material objects comprising steps of:

(a) conveying a mixture of material objects into and through an inspection zone;

(b) irradiating said mixture of material objects with incident electromagnetic radiation while in said inspection zone;

(c) measuring the electromagnetic radiation emanating from said irradiated mixture of material objects;

(d) processing [said measured] *measurements of* electromagnetic radiation to produce electronic images of said irradiated material objects and presenting said electronic images for visual display;

(e) interactively [selecting] *designating*, from said visual display of material objects, selected material objects to be sorted from said mixture of material objects *by using a computerized pointing device operable by a human operator*; and (f) [using an automated device to separate] *separating* said selected material objects from said mixture of material objects.

2. The method according to claim 1 wherein said [interactive selecting of material objects to be sorted is performed by a human operator using a computerized pointing device] *separating comprises using an automated device to separate said selected material objects from said mixture of material objects*.

3. The method according to claim 2 wherein said interactive [selecting] *designating* of material objects to be sorted by a human operator is analyzed by computerized learning and control algorithms so that identifications and [selections] *designations* for the said [selecting] *designating* of material items to be sorted is passed from the human operator to the computerized algorithms.

4. The method according to claim 3 wherein said mixture of material objects is comprised of solid waste materials.

5. The method according to claim 3 wherein said incident electromagnetic radiation is in the microwave wavelength range.

6. The method according to claim 3 wherein said incident electromagnetic radiation is in the ultraviolet wavelength range.

7. The method according to claim 3 wherein said incident electromagnetic radiation is in the visible light wavelength range.

8. The method according to claim 3 wherein said incident electromagnetic radiation is in the infrared wavelength range.

9. The method according to claim 3 wherein said incident electromagnetic radiation is in the x-ray wavelength range.

10. The method according to claim 3 wherein said incident electromagnetic radiation is in the gamma ray wavelength range.

11. The method according to claim 2 wherein said mixture of material objects is comprised of solid waste materials.

12. The method according to claim 2 wherein said incident electromagnetic radiation is in the microwave wavelength range.

13. The method according to claim 2 wherein said incident electromagnetic radiation is in the ultraviolet wavelength range.

14. The method according to claim 2 wherein said incident electromagnetic radiation is in the visible light wavelength range.

15. The method according to claim 2 wherein said incident electromagnetic radiation is in the infrared wavelength range.

16. The method according to claim 2 wherein said incident electromagnetic radiation is in the x-ray wavelength range.

17. The method according to claim 2 wherein said incident electromagnetic radiation is in the gamma ray wavelength range.

18. The method according to claim 1 wherein said interactive [selecting] *designating* of material objects to be sorted [is] performed by a human operator [and] is analyzed by computerized learning and control algorithms so that [decisions] *identifications and designations* for the [selecting] *designating* of material items to be sorted is passed from the human operator to the computerized algorithms.

19. The method according to claim 18 wherein said mixture of material objects is comprised of solid waste materials.

20. The method according to claim 18 wherein said incident electromagnetic radiation is in the microwave wavelength range.

21. The method according to claim 18 wherein said incident electromagnetic radiation is in the ultraviolet wavelength range.

22. The method according to claim 18 wherein said incident electromagnetic radiation is in the visible light wavelength range.

23. The method according to claim 18 wherein said incident electromagnetic radiation is in the infrared wavelength range.

24. The method according to claim 18 wherein said incident electromagnetic radiation is in the x-ray wavelength range.

25. The method according to claim 18 wherein said incident electromagnetic radiation is in the gamma ray wavelength range.

26. The method according to claim 1 wherein said mixture of material objects is comprised of solid waste materials.

27. The method according to claim 1 wherein said incident electromagnetic radiation is in the microwave wavelength range.

28. The method according to claim 1 wherein said incident electromagnetic radiation is in the ultraviolet wavelength range.

29. The method according to claim 1 wherein said incident electromagnetic radiation is in the visible light wavelength range.

30. The method according to claim 1 wherein said incident electromagnetic radiation is in the infrared wavelength range.

31. The method according to claim 1 wherein said incident electromagnetic radiation is in the x-ray wavelength range.

32. The method according to claim 1 wherein said incident electromagnetic radiation is in the gamma ray wavelength range.

33. An apparatus for identifying [and sorting] selected material objects from a mixture of material objects comprising:

(a) a conveyor that conveys a mixture of material objects into and through an inspection zone;

(b) an electromagnetic radiation source that irradiates said mixture of material objects within said inspection zone with incident electromagnetic radiation;

(c) a sensor that examines said material objects within said inspection zone and measures electromagnetic radiation emanating from said material objects;

(d) a [microprocessor] *computer system* that processes [said measured] *measurements of* electromagnetic radiation to produce electronic images of said material objects as they pass through said inspection zone and a display coupled to said [microprocessor] *computer system* that presents a visual display of said electronic images; [and]

(*e*) *a computerized pointing device; and*

[(e)] (*f*) a human operator interface to said visual display such that an operator may [select] *designate* selected material objects to be sorted from said mixture of objects *using the computerized pointing device*[; and (f) an automated device that separates said selected material objects from said mixture of material objects].

34. The apparatus according to claim 33 wherein said mixture of material objects is comprised of solid waste materials.

35. The apparatus according to claim 33 wherein said sensor includes a CCD camera.

36. The apparatus according to claim 33 wherein said conveyor is taken from a group consisting of a belt conveyor, a vibrating pan conveyor, a slide, and a free fall trajectory.

37. The apparatus according to claim 33 wherein said electromagnetic radiation source includes a lamp emitting radiation in the visible range.

38. The apparatus according to claim 33 wherein said display includes a computer monitor.

39. The apparatus according to claim 33 wherein said human operator interface includes a touch sensitive screen.

40. The apparatus according to claim [33] *52* wherein said automated device includes an air ejector.

41. The apparatus according to claim [33] *52* wherein said automated device includes a robotic arm.

42. The apparatus according to claim 41 wherein said robotic arm includes a suction cup end effector.

43. The apparatus according to claim 42 wherein said suction cup includes means to rotate said suction cup upward and which further includes means for disconnecting vacuum to said suction cup and means to provide compressed air to said suction cup to propel an object held by said suction cup into a receiving chute or bin.

44. The apparatus according to claim 41 wherein said robotic arm includes a driven and retractable spike end effector.

45. The apparatus according to claim 33 wherein said electromagnetic radiation emanating from said material objects as they pass through said inspection zone is passed through a filter to pass only selected wavelengths prior to measuring said electromagnetic radiation.

46. The apparatus according to claim 33 wherein said electromagnetic radiation source provides incident electromagnetic radiation in the microwave wavelength range.

47. The apparatus according to claim 33 wherein said electromagnetic radiation source provides incident electromagnetic radiation in the ultraviolet wavelength range.

48. The apparatus according to claim 33 wherein said electromagnetic radiation source provides incident electromagnetic radiation in the visible wavelength range.

49. The apparatus according to claim 33 wherein said electromagnetic radiation source provides incident electromagnetic radiation in the infrared wavelength range.

50. The apparatus according to claim 33 wherein said electromagnetic radiation source provides incident electromagnetic radiation in the x-ray wavelength range.

51. The apparatus according to claim 33 wherein said electromagnetic radiation source provides incident electromagnetic radiation in the gamma ray wavelength range.

*52. The apparatus according to claim 33, further comprising an automated device that separates said selected material objects from said mixture of material objects.*

*53. The apparatus according to claim 33, wherein the computer system comprises computerized learning and control algorithms so that identifications and selections for the selecting of material items to be sorted is passed from the human operator to the computerized algorithms.*

*54. The apparatus according to claim 33, wherein the visual display is remote from the inspection zone.*

*55. The method according to claim 1, wherein step (e) is performed remotely from the location where step (a) is performed.*

*56. The apparatus according to claim 33, wherein the computer system electronically tracks positions of selected material objects as they are further conveyed.*

*57. The method according to claim 1, further comprising the step of electronically tracking positions of selected material objects as they are further conveyed.*

*58. The apparatus according to claim 33, wherein the apparatus visually tags and displays selected material objects.*

*59. The method according to claim 1, further comprising the step of visually tagging and displaying selected material objects.*

* * * * *